US009470845B2

(12) United States Patent
Suzuki et al.

(10) Patent No.: US 9,470,845 B2
(45) Date of Patent: Oct. 18, 2016

(54) OPTICAL CONNECTION COMPONENT MANUFACTURING APPARATUS AND METHOD OF MANUFACTURING OPTICAL CONNECTION COMPONENT

(71) Applicant: TOMOEGAWA CO., LTD., Tokyo (JP)

(72) Inventors: Masayoshi Suzuki, Fujieda (JP); Nobuhiro Hashimoto, Shizuoka (JP)

(73) Assignee: TOMOEGAWA CO., LTD., Tokyo (JP)

( * ) Notice: Subject to any disclaimer, the term of this patent is extended or adjusted under 35 U.S.C. 154(b) by 169 days.

(21) Appl. No.: 14/220,421

(22) Filed: Mar. 20, 2014

(65) Prior Publication Data

US 2015/0234123 A1    Aug. 20, 2015

(30) Foreign Application Priority Data

Feb. 19, 2014 (JP) ................................ 2014-029604

(51) Int. Cl.
| | |
|---|---|
| *B32B 38/00* | (2006.01) |
| *G02B 6/26* | (2006.01) |
| *G02B 6/32* | (2006.01) |
| *G02B 6/42* | (2006.01) |

(52) U.S. Cl.
CPC ................ *G02B 6/262* (2013.01); *G02B 6/32* (2013.01); *G02B 6/4212* (2013.01)

(58) Field of Classification Search
CPC ........................... B32B 37/0046; G02B 6/262
See application file for complete search history.

(56) References Cited

U.S. PATENT DOCUMENTS

| | | | | |
|---|---|---|---|---|
| 5,376,213 | A * | 12/1994 | Ueda | ................... C23C 16/4586 156/345.27 |
| 5,853,812 | A | 12/1998 | Kawasaki et al. | |
| 7,440,657 | B2 | 10/2008 | Furue et al. | |
| 7,899,284 | B2 | 3/2011 | Furue et al. | |
| 2007/0160328 | A1* | 7/2007 | Furue | ................... G02B 6/3616 385/77 |
| 2008/0286456 | A1 | 11/2008 | Furue et al. | |

FOREIGN PATENT DOCUMENTS

| | | |
|---|---|---|
| JP | A 2007-183383 | 7/2007 |
| JP | A 2009-276784 | 11/2009 |
| JP | A 2009-276785 | 11/2009 |

(Continued)

OTHER PUBLICATIONS

Aug. 24, 2015 Office Action issued in U.S. Appl. No. 14/220,415.

(Continued)

*Primary Examiner* — Daniel McNally
(74) *Attorney, Agent, or Firm* — Oliff PLC

(57) ABSTRACT

Disclosed is an optical connection component manufacturing apparatus that manufactures an optical connection component in which a refractive index matching body is attached to a front end face of an optical fiber. A movement mechanism, an X-axis motor, and a movement stage that move the optical fiber set a first interval at which a refractive index matching liquid held on a holding face is adsorbed, by a Coulomb force according to the charging, onto a front end face of the optical fiber charged by a static electricity generating device and then enlarge the interval. The static electricity generating device applies electric charge to the optical fiber in the state of the first interval and continuously applies electric charge to the optical fiber even after the interval starts to be enlarged.

2 Claims, 9 Drawing Sheets

(56) References Cited

FOREIGN PATENT DOCUMENTS

| | | |
|---|---|---|
| JP | A 2013-54126 | 3/2013 |
| JP | A 2013-54127 | 3/2013 |

OTHER PUBLICATIONS

U.S. Appl. No. 14/220,415, filed Mar. 20, 2014.
Feb. 16, 2016 Office Action issued in U.S. Appl. No. 14/220,415.

* cited by examiner

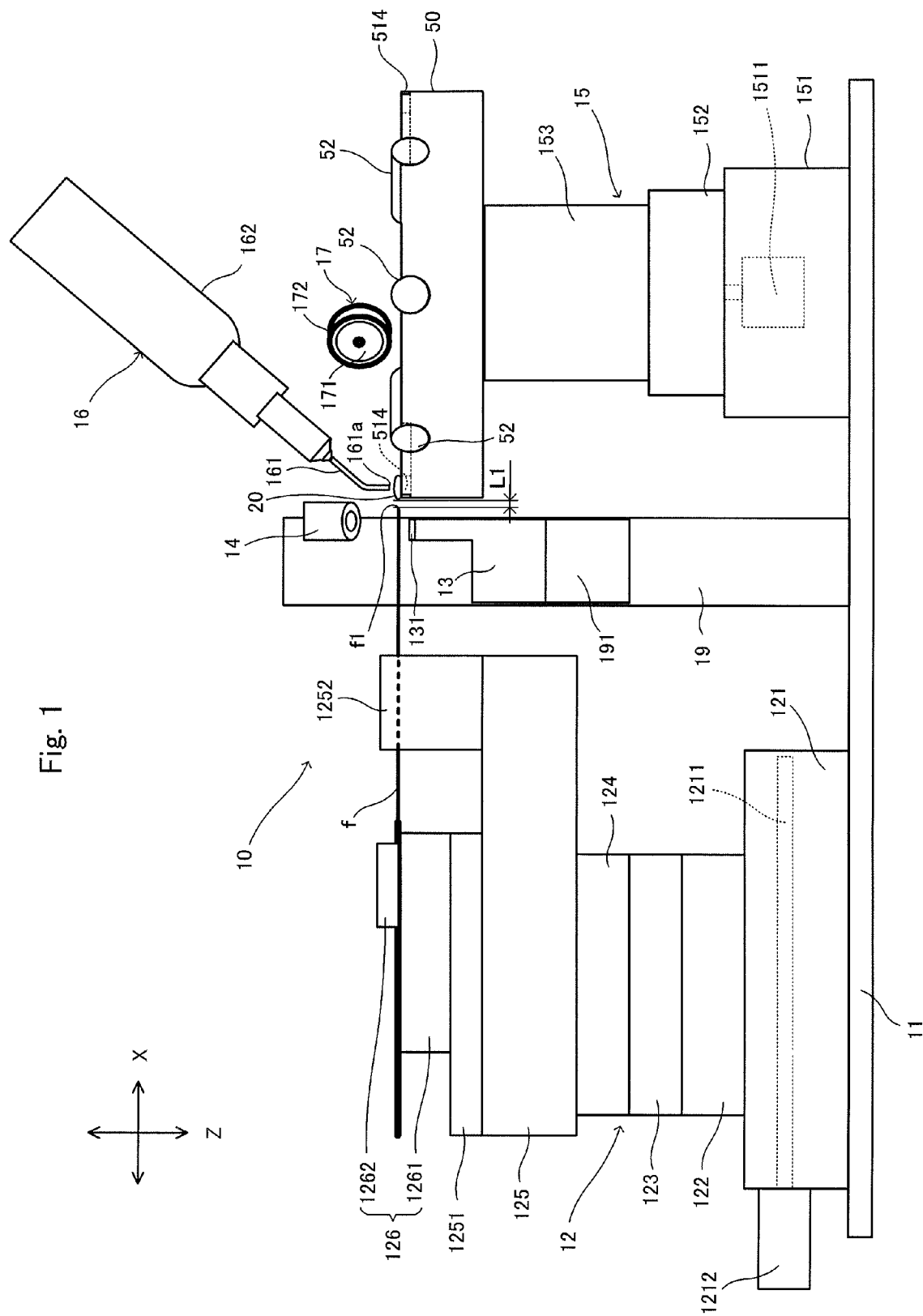

ОПTICAL CONNECTION COMPONENT MANUFACTURING APPARATUS AND METHOD OF MANUFACTURING OPTICAL CONNECTION COMPONENT

BACKGROUND

1. Technical Field

The present invention relates to an optical connection component manufacturing apparatus that manufactures an optical connection component in which a refractive index matching body is attached to a front end face of a linear optical member and a method of manufacturing an optical connection component in which a refractive index matching body is attached to a front end face of a linear optical member.

2. Related Art

Conventionally, as an optical connection component that connects optical members together, an optical connection component is known in which a refractive index matching body is attached to the front end face of a linear optical member. According to such an optical connection component, by pressing the end face of another optical member toward the front end face of the optical member to which the refractive index matching body is attached, the optical connection component and the another optical connection member are connected to each other. As an optical connection component manufacturing apparatus that manufactures such an optical connection component, an apparatus is known in which a refractive index matching liquid acquired by dissolving a refractive index matching body into a solvent having volatility is supplied to a holding wall so as to be held thereby, and the refractive index matching liquid is adsorbed onto the front end face of an optical member by allowing the charged linear optical member to approach the refractive index matching liquid that is held by the holding wall.

In addition, an optical connection component manufacturing apparatus and a method of manufacturing an optical connection component in which adsorption of a refractive index matching liquid of a desired amount onto the front end face of an optical member is implemented have been proposed (for example, see JP 2013-54126 A or the like). According to the optical connection component manufacturing apparatus and the method of manufacturing an optical connection component disclosed in JP 2013-54126 A, a refractive index matching liquid acquired by dissolving a refractive index matching body into a solvent having volatility is supplied to a holding unit so as to be held thereby. Then, a time required for the density of the refractive index matching body in the refractive index matching liquid to arrive at a desired density in accordance with volatilization of the solvent of the refractive index matching liquid is checked in advance, and, by charging the optical member when the time elapses, the refractive index matching liquid is adsorbed onto the front end face of the optical member.

SUMMARY

However, the density of the refractive index matching body in the refractive index matching liquid held by the holding unit is influenced by the temperature, the humidity, and the like of the periphery of the optical connection component manufacturing apparatus, and accordingly, a time required for the density of the refractive index matching body to arrive at the desired density varies. Thus, according to the optical connection component manufacturing apparatus and the method of manufacturing an optical connection component disclosed in JP 2013-54126 A, there are cases where it is difficult to adsorb the refractive index matching liquid of a desired amount onto the front end face of the optical member depending on the conditions of the temperature, the humidity, and the like of the periphery of the optical connection component manufacturing apparatus. In addition, an interval between optical members changes as the connected optical member moves in accordance with a difference in the coefficient of thermal expansion or the like. Accordingly, there are cases where it is required to increase the film thickness of the refractive index matching body attached to the optical connection component so as to follow a change in the interval between the connected optical members. However, in the optical connection component manufacturing apparatus and the method of manufacturing an optical connection component disclosed in JP 2013-54126 A, there are cases where it is difficult to increase the film thickness of the refractive index matching body attached to the optical connection component.

According to the present invention, there are provided an optical connection component manufacturing apparatus and a method of manufacturing an optical connection component capable of adsorbing the refractive index matching liquid of a desired amount onto the front end face of an optical member and increasing the film thickness of a refractive index matching body attached to the optical connection component.

According to the present invention, there is provided an optical connection component manufacturing apparatus that manufactures an optical connection component in which a refractive index matching body is attached to a front end face of a linear optical member. The optical connection component manufacturing apparatus includes: a holding face that holds a refractive index matching liquid acquired by dissolving a refractive index matching body into a solvent having volatility; a supply unit that supplies the refractive index matching liquid to the holding face; a charging unit that charges the optical member so that the refractive index matching liquid supplied to the holding face is adsorbed onto the front end face of the optical member; and an interval adjusting unit that adjusts an interval between the refractive index matching liquid held on the holding face and the front end face of the optical member by moving at least one of the holding face and the optical member. The interval adjusting unit sets the interval to a first interval at which the refractive index matching liquid held on the holding face is adsorbed, by a Coulomb force according to the charging, onto the front end face of the optical member charged by the charging unit and then enlarges the interval, and the charging unit applies electric charge to the optical member in a state in which the interval is the first interval and continuously applies electric charge to the optical member even after the interval starts to be enlarged.

According to the optical connection component manufacturing apparatus of the present invention, the refractive index matching liquid is adsorbed onto the front end face of the optical member in the state in which the interval is the first interval, and the interval is enlarged in the state in which the refractive index matching liquid is adsorbed onto the front end face of the optical member by applying electric charge to the optical member. Accordingly, by adjusting a time during which electric charge is applied to the optical member, the refractive index matching liquid of a desired amount can be adsorbed onto the front end face of the optical member. In addition, even after the interval starts to be enlarged than the first interval, the state in which the refractive index matching liquid is adsorbed, by a Coulomb force according to the charging, onto the front end face of the optical member is continued. Accordingly, the amount of the refractive index matching liquid adsorbed onto the optical connection component is increased, whereby the film thickness of the refractive index matching body attached to the optical connection component can be increased.

The linear optical member described here may be an optical member having a large length in the axial center direction with respect to the thickness regardless of the cross-sectional shape.

In the optical connection component manufacturing apparatus of the present invention, it is preferable that the interval adjusting unit stop the movement at a time point when the interval is a second interval that is larger than the first interval and then further enlarges the interval, and the charging unit continuously apply electric charge at least to the optical member until the interval is the second interval.

The interval adjusting unit is configured to stop the movement at a time point when the interval is the second interval that is larger than the first interval, whereby the adsorption of the refractive index matching liquid of a desired amount onto the front end face of the optical member can be easily adjusted.

In addition, in the optical connection component manufacturing apparatus of the present invention, the charging unit may end the applying of electric charge to the optical member at a time point when a time during which the second interval is maintained arrives at a predetermined time after the interval becomes the second interval.

In other words, the charging unit ends the application of electric charge to the optical member after the interval is the second interval.

The interval adjusting unit may further enlarge the interval from a time point when the time reaches the predetermined time and may further enlarge the interval after the reach of the predetermined time.

In addition, according to the present invention, there is provided an optical connection component manufacturing method for manufacturing an optical connection component in which a refractive index matching body is attached to a front end face of a linear optical member. The method includes: supplying a refractive index matching liquid acquired by dissolving a refractive index matching body into a solvent having volatility to a holding face and holding the refractive index matching liquid on the holding face; moving at least one of the holding face and the optical member to adjust an interval between the refractive index matching liquid held on the holding face by the supplying and holding of the refractive index matching liquid and the front end face of the optical member to a first interval at which the refractive index matching liquid held on the holding face is adsorbed, by a Coulomb force according to the charging, onto the front end face of the charged optical member; charging the optical member so that the refractive index matching liquid held on the holding face is adsorbed onto the front end face of the optical member; and enlarging the interval by moving at least one of the holding face and the optical member, in which, in the charging of the optical member, electric charge is applied to the optical member in a state in which the interval is the first interval, and electric charge is continuously applied to the optical member even after the interval starts to be enlarged in the enlarging of the interval.

The start timing of the charging of the optical member is not particularly limited.

According to the method of manufacturing an optical connection component of the present invention, similarly to the optical connection component manufacturing apparatus of the present invention, the refractive index matching liquid of a desired amount can be adsorbed onto the front end face of the optical member, and the film thickness of the refractive index matching body attached to the optical connection component can be increased.

In the method of manufacturing an optical connection component according to the present invention, it may be configured such that, in the enlarging of the interval, the movement is stopped at a time point when the interval is a second interval that is larger than the first interval and thereafter the interval is further enlarged, and, in the charging of the optical member, electric charge is continuously applied at least to the optical member until the interval is the second interval.

In such a case, adsorption of the refractive index matching liquid of a desired amount onto the front end face of the optical member can be easily adjusted.

In the method of manufacturing an optical connection component according to the present invention, in the charging of the optical member, the applying of electric charge to the optical member may end at a time point when a time during which the second interval is maintained arrives at a predetermined time after the interval becomes the second interval.

In other words, in the charging of the optical member, after the interval becomes the second interval, the application of electric charge to the optical member ends.

In addition, in the enlarging of the interval, the interval may be further enlarged at a time point when the time arrives at the predetermine time, or the interval may be further enlarged after the reach of the predetermined time.

According to the present invention, there are provided an optical connection component manufacturing apparatus and a method of manufacturing an optical connection component capable of adsorbing a refractive index matching liquid of a desired amount onto the front end face of an optical member and increasing the film thickness of a refractive index matching body attached to the optical connection component.

BRIEF DESCRIPTION OF DRAWINGS

FIG. 1 is a side view that illustrates an optical connection component manufacturing apparatus according to an embodiment of the present invention;

DETAILED DESCRIPTION

Figure 2A:
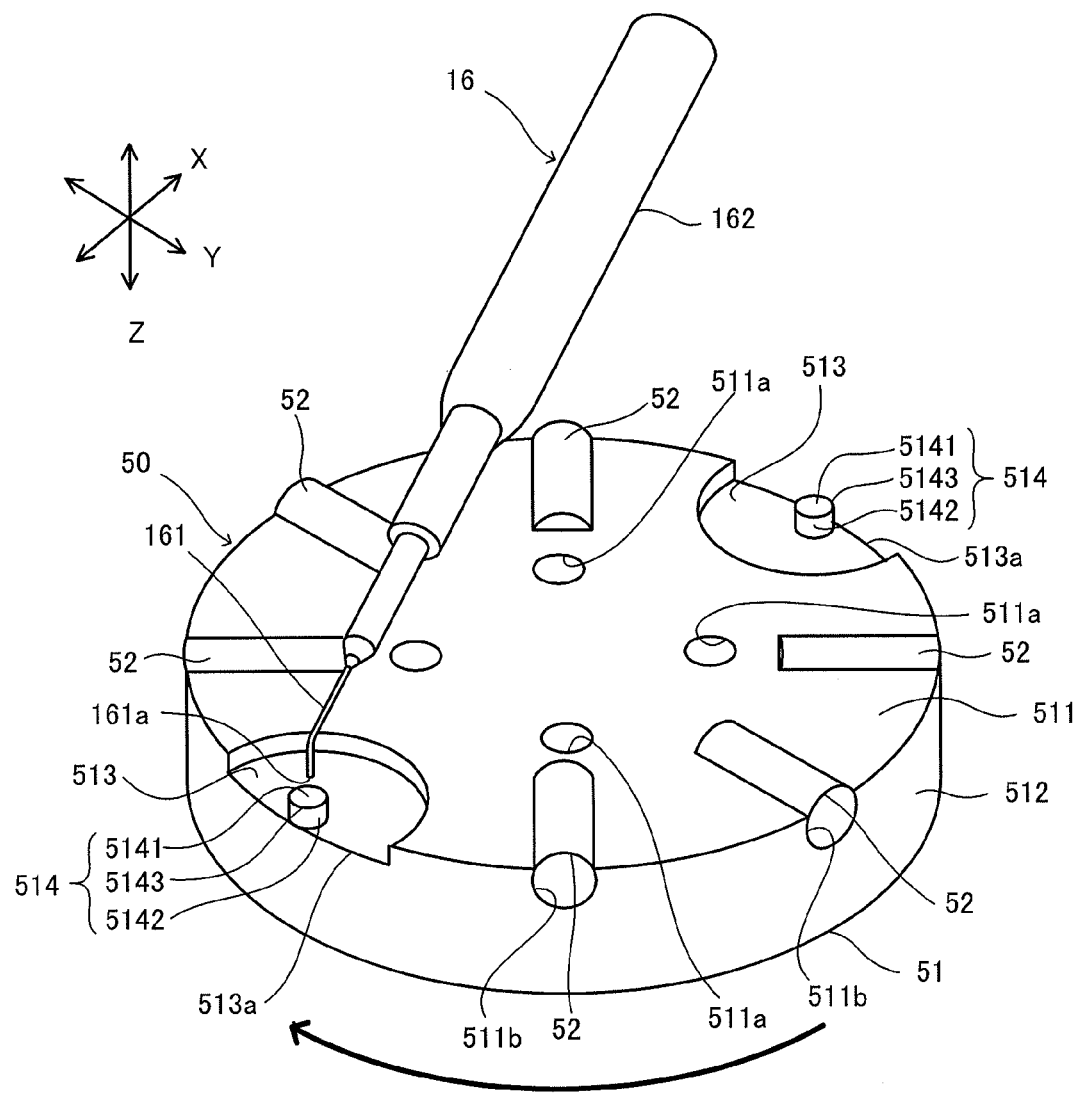
FIG. 2A is a perspective view that illustrates a holding unit and a dispenser.

Hereinafter, an optical connection component manufacturing apparatus according to an embodiment of the present invention will be described with reference to the drawings. In this embodiment, a case where an optical fiber that is a linear dielectric is used as an optical member will be described as an example.

FIG. 1 is a side view that illustrates an optical connection component manufacturing apparatus according to an embodiment of the present invention. In description presented below, a leftward/rightward direction in FIG. 1 may be referred to as the X-axis direction, an upward/downward direction in FIG. 1 may be referred to as the Z-axis direction, and a direction perpendicular to the sheet face of FIG. 1 may be referred to as the Y-axis direction. In addition, the right side in FIG. 1 may be referred to as the X side, and the left side may be referred to as the –X side. FIG. 1 illustrates the optical connection component manufacturing apparatus seen from the side of an operator of the optical connection component manufacturing apparatus.

The optical connection component manufacturing apparatus 10 illustrated in FIG. 1 is an apparatus that manufactures an optical connection component in which a refractive index matching body is attached to a front end face f1 of an optical fiber f. This optical connection component manufacturing apparatus 10 includes: a frame 11; a fiber moving unit 12; a static electricity generating device 13; a fiber detecting device 14; a refractive index matching liquid holding unit 15; and a dispenser 16.

The fiber moving unit 12 is equipped with: a movement base 121; a movement stage 122; an X-axis adjustment stage 123; a Y-axis adjustment stage 124; a fiber holding stand 125; and a fiber fixture 126. This fiber moving unit 12 moves the optical fiber f mounted to the fiber holding stand 125 in the X-axis direction.

The movement base 121 is fixed to the frame 11. On this movement base 121, a movement mechanism 1211 that moves the movement stage 122 in the X-axis direction and an X-axis motor 1212 that is connected to the movement mechanism 1211 are assembled. The movement mechanism 1211 is a ball screw that converts rotational motion into linear motion. By driving the X-axis motor 1212, the movement mechanism 1211 is operated, whereby the movement stage 122 is moved in the X-axis direction at an arbitrary speed. The X-axis adjustment stage 123, the Y-axis adjustment stage 124, the fiber holding stand 125, the fiber fixture 126, and the optical fiber f move in the X-axis direction together with the movement stage 122. In accordance with the movement of the movement stage 122 to the X side, the front end face f1 of the optical fiber f approaches a refractive index matching liquid 20 held in the refractive index matching liquid holding unit 15, an interval between the refractive index matching liquid 20 and the front end face f1 of the optical fiber f is adjusted. The movement mechanism 1211, the X-axis motor 1212, and the movement stage 122 that move the optical fiber f correspond to an example of an interval adjusting unit. FIG. 1 illustrates a state in which the front end face f1 of the optical fiber f is located at an approach position that approaches the refractive index matching liquid 20 held by the refractive index matching liquid holding unit 15. This approach position, as will be described later, is a position at a time when the refractive index matching liquid 20 is adsorbed, by a Coulomb force according to the charging of the optical fiber, onto the front end face f1 of the optical fiber f charged by the static electricity generating device 13. Hereinafter, an interval between the refractive index matching liquid 20 and the front end face f1 of the optical fiber f at the approach position may be referred to as a first interval L1.

The X-axis adjustment stage 123 is mounted on the movement stage 122. In this X-axis adjustment stage 123, an adjustment screw not illustrated in the figure is disposed. By rotating the adjustment screw, the position of the X-axis adjustment stage 123 in the X-axis direction with respect to the movement stage 122 is adjusted. In addition, the Y-axis adjustment stage 124 is mounted on the X-axis adjustment stage 123. In this Y-axis adjustment stage 124, an adjustment screw not illustrated in the figure is disposed. By rotating the adjustment screw, the position of the Y-axis adjustment stage 124 in the Y-axis direction with respect to the X-axis adjustment stage 123 is adjusted. The fiber holding stand 125 is fixed to the Y-axis adjustment stage 124. In other words, the fiber holding stand 125 is configured such that the positions in the X-axis and Y-axis directions with respect to the movement stage 122 can be adjusted by being mounted to the movement stage 122 through the X-axis adjustment stage 123 and the Y-axis adjustment stage 124. Such adjustment stages 123 and 124 are used for adjusting the positions of the optical fiber f, which is mounted to the fiber holding stand 125, in the X-axis and Y-axis directions.

In a portion of the fiber holding stand that is disposed on the –X side (the left side in FIG. 1) of the fiber holding stand 125, a fiber mounting portion 1251 is disposed, and, in a portion of the fiber holding stand 125 that is disposed on the X side (the right side in FIG. 1), a position regulating portion 1252 is disposed. On the fiber mounting portion 1251, the fiber fixture 126 is disposed to be detachably attached to the fiber mounting portion 1251. This fiber fixture 126 is configured by a fiber placing member 1261 and a pressing member 1262.

The optical fiber f is fixed to the fiber fixture 126 by being interposed between the fiber placing member 1261 and the pressing member 1262 in a state in which the coating is removed over a predetermined length (e.g., 40 mm) from the front end face f1. A portion of the optical fiber f that is interposed between the fiber placing member 1261 and the pressing member 1262 is a portion in which the coating remains. In the position regulating portion 1252, a V groove having a "V" form seen from the X-axis direction is formed. By bringing the outer peripheral surface of a front-end side portion of the optical fiber f closely to the inclined face of the "V" groove, the positions of the front-end side portion of the optical fiber f in the Y-axis and Z-axis directions are regulated. The optical fiber f is mounted to the fiber holding stand 125 in the state being fixed to the fiber fixture 126, and, by regulating the position of the front end side portion thereof using the position regulating portion 1252, the optical fiber is mounted to the fiber holding stand 125 with the axis center thereof being placed in the X-axis direction. Accordingly, the optical fiber f is supported such that the front end face f1 of the optical fiber f faces the refractive index matching liquid 20 in a direction intersecting the thickness direction of the refractive index matching liquid 20 with the front end face f1 being spaced from the refractive index matching liquid 20 held by a holding face to be described later. In other words, the fiber fixture 126 and the position regulating portion 1252 correspond to an example of a support member.

To the X side from the fiber moving unit 12, a bracket 19 fixed to the frame 11 is disposed. A post 191 that extends in the Y-axis direction is fixed to the bracket 19. In addition, the static electricity generating device 13 is fixed to the post 191. In other words, the static electricity generating device 13 is fixed to the frame 11 through the post 191 and the bracket 19, whereby the position thereof inside the optical connection component manufacturing apparatus 10 is fixed. The static electricity generating device 13 applies electric charge to the optical fiber f that is mounted to the fiber moving unit 12. In other words, the static electricity generating device 13 charges the optical fiber f mounted to the fiber moving unit 12 and corresponds to an example of a charging unit. In an upper end portion of the static electricity generating device 13, a plate-shaped electrode sheet 131 having an electrode embedded inside a dielectric such as ceramics is disposed. A gap of 0.1 mm to 0.2 mm is disposed between the electrode sheet 131 and the optical fiber f mounted to the fiber moving unit 12 in the height direction (Z-axis direction). When a voltage is applied to the electrode of the electrode sheet 131, electric charge is applied to the optical fiber f so as to be charged with static electricity with the optical fiber f being maintained to be in a non-contact state with the electrode sheet 131. Since the non-contact state between the optical fiber f and the electrode sheet 131 is maintained, damage in the optical fiber f due to a contact is prevented. Here, instead of the static electricity generating device 13, a charging unit that charges the optical fiber f by using corona discharge or the like may be used.

The fiber detecting device 14 is mounted in the bracket 19 through an arm not illustrated in the figure. This fiber detecting device 14 is a sensor that detects the front end face f1 of the optical fiber f. The optical fiber f mounted to the fiber holding stand 125 moves in the X-axis direction in accordance with the movement of the movement stage 122 in the X-axis direction. The fiber detecting device 14 detects the arrival of the front end face f1 of the optical fiber f at a predetermined position (here, right above the electrode sheet 131) in accordance with the movement in the X-axis direction.

The refractive index matching liquid holding unit 15 is equipped with: a rotary base 151; a rotary stage 152; a Z-axis adjustment stage 153; and a holding unit 50 that holds the refractive index matching liquid 20. The rotary base 151 is fixed to the frame 11. In this rotary base 151, a rotary motor 1511 that rotates the rotary stage 152 is assembled. The rotary stage 152 is mounted on the rotary base 151 to be rotatable. By driving the rotary motor 1511, the rotary stage 152 is rotated around the Z-axis direction axis as the rotation center axis.

The Z-axis adjustment stage 153 is mounted on the rotary stage 152. In this Z-axis adjustment stage 153, an adjustment screw not illustrated in the figure is disposed. By rotating the adjustment screw, the position of the Z-axis adjustment stage 153 in the Z-axis direction with respect to the rotary stage 152 is adjusted. The holding unit 50 is fixed to the Z-axis adjustment stage 153. In other words, the holding unit 50 is mounted to the rotary stage 152 through the Z-axis adjustment stage 153, and the position thereof in the Z-axis direction with respect to the rotary stage 152 is freely adjustable. Such a Z-axis adjustment stage 153 is used for adjusting relative positions of the front end face f1 of the optical fiber f mounted to the fiber holding stand 125 and the refractive index matching liquid 20 held by the refractive index matching liquid holding unit 15 in the Z-axis direction.

The holding unit 50 is made using a resin and rotates around the Z-axis direction axis as the rotation center axis together with the Z-axis adjustment stage 153 when the rotary stage 152 rotates. The dispenser 16 is configured by a nozzle 161 and a cylinder 162. A supply port 161a is formed at the front end of the nozzle 161. Although the diameter of the nozzle 161 is not particularly limited, in this embodiment, a nozzle having an inner diameter of 0.41 mm and an outer diameter of 0.71 mm is used. Inside the cylinder 162, the refractive index matching liquid 20 is stored. The cylinder 162 is connected to a compressor not illustrated in the figure and, when air is supplied from the compressor, drips the refractive index matching liquid 20 stored inside the cylinder 162 from the supply port 161a of the nozzle 161. In other words, the dispenser 16 according to this embodiment corresponds to an example of a supply unit. The cylinder 162 is supported by an arm, which is not illustrated in the figure, fixed to the frame 11.

FIG. 2A is a perspective view that illustrates the holding unit 50 and the dispenser 16. In FIG. 2A, a direction joining an obliquely upward direction toward the right side and an obliquely downward direction toward the left side is the X-axis direction, a direction joining an obliquely upward direction toward the left side and an obliquely downward direction toward the right side is the Y-axis direction, and the upward/downward direction is the Z-axis direction.

As illustrated in FIG. 2A, the holding unit 50 is equipped with: a disk-shaped main body 51; and a plurality of cleaning members 52 mounted to the main body 51. The main body 51 has a circle-shaped upper face portion 511 and a cylinder-shaped peripheral face portion 512. The holding unit 50 rotates around the Z-axis direction axis passing through the center of the circle-shaped upper face portion 511 as the rotation center axis. In a boundary portion of the main body 51 between the upper face portion 511 and the peripheral face portion 512, on the X side and the −X side, concave portions 513 each depressed in a semi-circle shape are formed from the peripheral face portion 512 toward the rotation center axis, and, at the boundary between the bottom of each concave portion 513 and the peripheral face portion 512, arc-shaped concave portion outer edges 513a are formed. In each one of the concave portions 513 forming one pair, a cylinder-shaped protruded portion 514 protruding toward the upper side is disposed at a position following the center portion of the concave portion outer edge 513a. The protruded portion 514 includes a holding face 5141 that is the front end face, a cylinder-shaped side face 5142, and an outer peripheral edge 5143 that is a boundary between the holding face 5141 and the side face 5142. The holding face 5141 has a horizontal and flat circular shape and is formed by connecting the outer peripheral edge 5143 in a curved line. The protruded portions 514 are disposed integrally with the main body 51. Here, the protruded portions 514 may be formed as bodies that are separate from the main body 51. In addition, a form may be employed in which the concave portions 513 are omitted and the protruded portions 514 protrude to the upper side from the upper face portion 511. In the upper face portion 511 of the main body 51, a plurality of screw through holes 511a used for allowing screws fixing the holding unit 50 to the Z-axis adjustment stage 153 to pass through them are disposed.

Meanwhile, in a case where the supply port 161a is not wiped off after the refractive index matching liquid 20 is dripped from the supply port 161a of the nozzle 161, the refractive index matching liquid 20 remaining in the supply port 161a is solidified. In such a case, there is concern that the direction of the refractive index matching liquid 20 dripping from the supply port 161a may change, or the nozzle 161 may be clogged. The cleaning members 52 wipe off the refractive index matching liquid 20 that remains in the supply port 161a. The cleaning members 52 are formed using stainless steel and have a cylinder shape that has an outer diameter of about 6 mm. In the main body 51, a plurality of attachment portions 511b corresponding to the shape of the cleaning members 52 are disposed at positions located on the outer peripheral side from the screw through holes 511a. The attachment portions 511b are depressions extending in a radial direction with respect to the rotation center axis of the holding unit 50 and are disposed at a predetermined interval between the concave portions 513 forming one pair in the peripheral direction of the main body 51. Each one of the plurality of the attachment portions 511b is installed in a posture in which the cleaning members 52 extend in a radial direction with respect to the rotation center axis of the holding unit 50. In this embodiment, while three cleaning members 52 are installed between the concave portions 513 forming one pair in the peripheral direction of the main body 51, the number of the cleaning members 52 is not limited thereto. Thus, one, two, four or more cleaning members 52 may be installed between the concave portions 513 forming one pair.

The upper end portion of the cleaning member 52 that is installed to the attachment portion 511b protrudes from the upper face portion 511 of the main body 51 in an arc shape when seen from the side face, and the height of the upper end portion of the cleaning member 52 is set to be higher than that of the supply port 161a of the nozzle 161 by about 0.2 mm to 0.3 mm. Accordingly, when the holding unit 50 is rotated as denoted by an arrow having an arc shape illustrated in the figure around the Z-axis direction axis as the rotation center axis, each one of the upper end portions of the plurality of the cleaning members 52 is brought into contact with the supply port 161a of the nozzle 161. Accordingly, as will be described later, after the refractive index matching liquid 20 is supplied from the supply port 161a of the nozzle 161, the refractive index matching liquid 20 remaining in the supply port 161a can be wiped off by the cleaning members 52. Here, all the portions of the cleaning members 52 that are protruded from the upper face portion 511 do not need to have an arc shape when seen from the side face, but only a portion that is brought into contact with the supply port 161a of the nozzle 161 at the time of rotating the holding unit 50 may be configured to have an arc shape. Furthermore, a portion of the cleaning member 52 that protrudes from the upper face portion 511 may be configured to be in a mountain shape when seen from the side face. However, by employing a form in which the portion of the cleaning member 52 that protrudes from the upper face portion 511 is configured to be in an arc shape when seen from the side face, the followability of the upper end portion of the cleaning member 52 at the time of being brought into contact with the supply port 161a of the nozzle 161 is good, and accordingly, it is easy to wipe off the refractive index matching liquid 20 remaining in the supply port 161a. Here, the cleaning members 52 may be integrally configured with the main body 51.

As illustrated in FIG. 1, on the upper side of the holding unit 50, a removal member 17 is disposed. The removal member 17 is supported by an arm, which is not illustrated in the figure, fixed to the frame 11 to be rotatable around an axis of the direction perpendicular to the Z-axis direction as the rotation center axis. In this embodiment, an axis extending in the radial direction with respect to the rotation center axis of the holding unit 50 is set as the rotation center axis of the removal member 17. The removal member 17 includes a disk-shaped rotary table 171 and a sheet material 172 that is wound around the outer periphery of the rotary table 171. The sheet material 172 is not particularly limited, but a sheet having an adhesive surface, a sheet composed using a material having high water absorbency, or the like may be used as the sheet material 172. In this embodiment, a double-sided tape having a cushioning property is used as the sheet material 172. The removal member 17 is set such that the height position of the lower end thereof is lower than the height position of the upper end portion of the cleaning member 52 installed to the main body 51 by about 0.2 mm to 0.3 mm. Accordingly, by rotating the holding unit 50 around the Z-axis direction axis as the rotation center axis, each one of the upper end portions of the plurality of the cleaning members 52 is brought into contact with the sheet material 172 of the removal member 17, and the removal member 17 rotates as the contact with the sheet material 172. The position of the removal member 17 is adjusted such that the sheet material 172 is brought into contact with a portion, from which the refractive index matching liquid 20 is wiped off from the supply port 161a, of the upper end portion of the cleaning member 52. By bringing the portion of the cleaning member 52 from which the refractive index matching liquid 20 is wiped off into contact with the sheet material 172, the refractive index matching liquid 20 wiped off from the supply port 161a can be removed from the cleaning member 52. As a result of this, the refractive index matching liquid 20 wiped off from the supply port 161a by the cleaning member 52 can be prevented from being attached to the supply port 161a again. Here, the cleaning member 52 does not necessarily need to be rotated. However, by employing a configuration in which the removal member 17 is rotated, the entire outer periphery of the sheet material 172 can be used for removing the refractive index matching liquid 20. In addition, in a case where the contact with the cleaning member 52 is repeated, and the sheet material 172 becomes dirty, or the adhesiveness thereof decreases, the sheet material 172 may be peeled off from the rotary table 171 and be replaced with a new sheet material 172.

FIGS. 1 and 2A illustrate a state in which the supply port 161a of the nozzle 161 is positioned on the upper side of the holding face 5141 of the protruded portion 514. Hereinafter, the posture of the holding unit 50 in the state illustrated in FIGS. 1 and 2A may be referred to as a supply posture. The positional relation between the holding face 5141 and the supply port 161a in the state illustrated in FIGS. 1 and 2A may be referred to as supply position relation, and the positional relation between the holding face 5141 and the supply port 161a in a state in which the supply port 161a deviates from the upper side of the holding face 5141 may be referred to as non-supply position relation. The holding unit 50 rotates as denoted by a curved-line arrow in the figure from the supply posture illustrated in FIG. 2A and stops rotation in the supply posture in which the supply port 161a of the nozzle 161 is positioned on the upper side of the holding face 5141 of the other protruded portion 514. Accordingly, the positional relation between the holding face 5141 and the supply port 161a changes between the supply position relation and the non-supply position relation.

In this embodiment, by dripping the refractive index matching liquid 20 from the supply port 161a onto the holding face 5141, the refractive index matching liquid 20 is supplied to the holding face 5141. FIG. 1 illustrates the state in which the refractive index matching liquid 20 supplied to the holding face 5141 is held on the holding face 5141 in accordance with the surface tension thereof. The refractive index matching liquid 20 is a solution acquired by dissolving a refractive index matching body into a solvent having volatility. This refractive index matching liquid 20 is solidified as the solvent contained in the liquid volatiles, and the refractive index matching body of the gel phase having elasticity remains. The refractive index matching body is a material having a refractive index that is close to the refractive index of the optical fiber f and having adhesiveness that is appropriate to the optical fiber f. In this embodiment, although an acrylic high polymer material having environmental resistance and high adhesiveness is used as the refractive index matching body, any other high polymer material may be used.

Figure 2B:
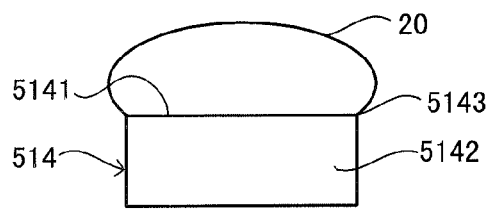
FIGS. 2B and 2C are enlarged side views that represent a protruded portion in which a refractive index matching liquid is held on a holding face in an enlarged scale.
Figure 2C:
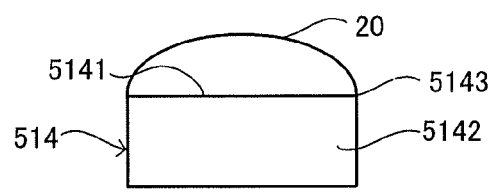

FIGS. 2B and 2C are enlarged side views that represent the protruded portion in which the refractive index matching liquid is held on the holding face in an enlarged scale.

FIG. 2B illustrates a state in which the refractive index matching liquid 20 is supplied from the supply port 161a to the holding face 5141 until the refractive index matching liquid 20 held on the holding face 5141 swells up to the outer side of the outer peripheral edge 5143 in accordance with the surface tension of the refractive index matching liquid 20. As described above, since the holding face 5141 has the outer peripheral edge 5143 connected in the curved line, it is easy for the refractive index matching liquid 20 held on the holding face 5141 to rise based on the effect of the outer peripheral edge 5143. Accordingly, the rise height of the refractive index matching liquid 20 can be sufficiently secured. In addition, since the holding face 5141 is partitioned by the outer peripheral edge 5143 connected in the curved line, the supply of the refractive index matching liquid 20 can be easily adjusted such that the rise height of the refractive index matching liquid 20 held on the holding face 5141 is constant. In addition, the rise state according to the surface tension of the refractive index matching liquid 20 held on the holding face 5141 is stabilized by the outer peripheral edge 5143 connected in the curved line. Particularly, as illustrated in FIG. 2B, when the refractive index matching liquid 20 held on the holding face 5141 is in the state of swelling to the outer side of the outer peripheral edge 5143 according to the surface tension of the refractive index matching liquid 20, the refractive index matching liquid 20 held on the holding face 5141 is stabilized more. Accordingly, the rise of the refractive index matching liquid 20 held on the holding face 5141 can be sufficiently secured. In addition, by stabilizing the rise state of the refractive index matching liquid 20, the rise height can be easily adjusted to be constant. As a result of this, the positional adjustment between the front end face f1 of the optical fiber f and the refractive index matching liquid 20 held on the holding face 5141 in the Y-axis direction does not need to be precisely performed, whereby an adjustment operation can be easily performed. In addition, the refractive index matching liquid 20 may be supplied to the holding face 5141 until at least the refractive index matching liquid 20 that the front end face f1 of the optical fiber f faces out of the refractive index matching liquid 20 held on the holding face 5141 swells up to the outer side of the outer peripheral edge 5143 in accordance with the surface tension of the refractive index matching liquid 20.

FIG. 2C illustrates a state in which the refractive index matching liquid 20 is supplied to the holding face 5141 until the refractive index matching liquid 20 held on the holding face 5141 arrives at the outer peripheral edge 5143. The refractive index matching liquid 20 held on the holding face 5141 does not necessarily need to swell to the outer side of the outer peripheral edge 5143. As illustrated in FIG. 2C, by supplying the refractive index matching liquid 20 until the refractive index matching liquid 20 held on the holding face 5141 arrives at the outer peripheral edge 5143, the refractive index matching liquid 20 can easily rise by the outer peripheral edge 5143 connected in the curved line. In addition, the rise state according to the surface tension of the refractive index matching liquid 20 held on the holding face 5141 is stabilized. Furthermore, the supply of the refractive index matching liquid 20 can be easily adjusted such that the rise height of the refractive index matching liquid 20 held on the holding face 5141 is constant.

The holding face 5141 does not necessarily need to have a circular shape and, for example, may have an oval shape or a shape of which the outer peripheral edge 5143 is configured by connecting a plurality of arc-shaped curves having mutually-different radiuses of curvatures, in other words, a shape having no corner. When there is a corner on the outer peripheral edge of the holding face, the surface tension of the refractive index matching liquid 20 held on the holding face may easily collapse in accordance with the corner, and the rise state of the refractive index matching liquid 20 is not stabilized. However, in the case of a holding face that can be substantially regarded as a circular shape like a 36-sided regular polygon, although there are corners when precisely described, the surface tension of the refractive index matching liquid 20 does not easily collapse in accordance with the corners, and such a shape is included in the holding face of which the outer peripheral edge is connected in a curved line.

The holding face 5141 may have a convex shape, a shape of concavity and convexity, or an inclined shape. However, in order to easily wipe off the refractive index matching liquid 20 remaining on the holding face 5141, as will be described later, by stabilizing the rise state of the refractive index matching liquid 20 held on the holding face 5141, it is preferable that the holding face 5141 is horizontal or flat. Furthermore, in a case where the stability of the refractive index matching liquid 20 held on the holding face 5141 is of significance, the holding face 5141 may be configured to be in a concave shape.

Figure 3:
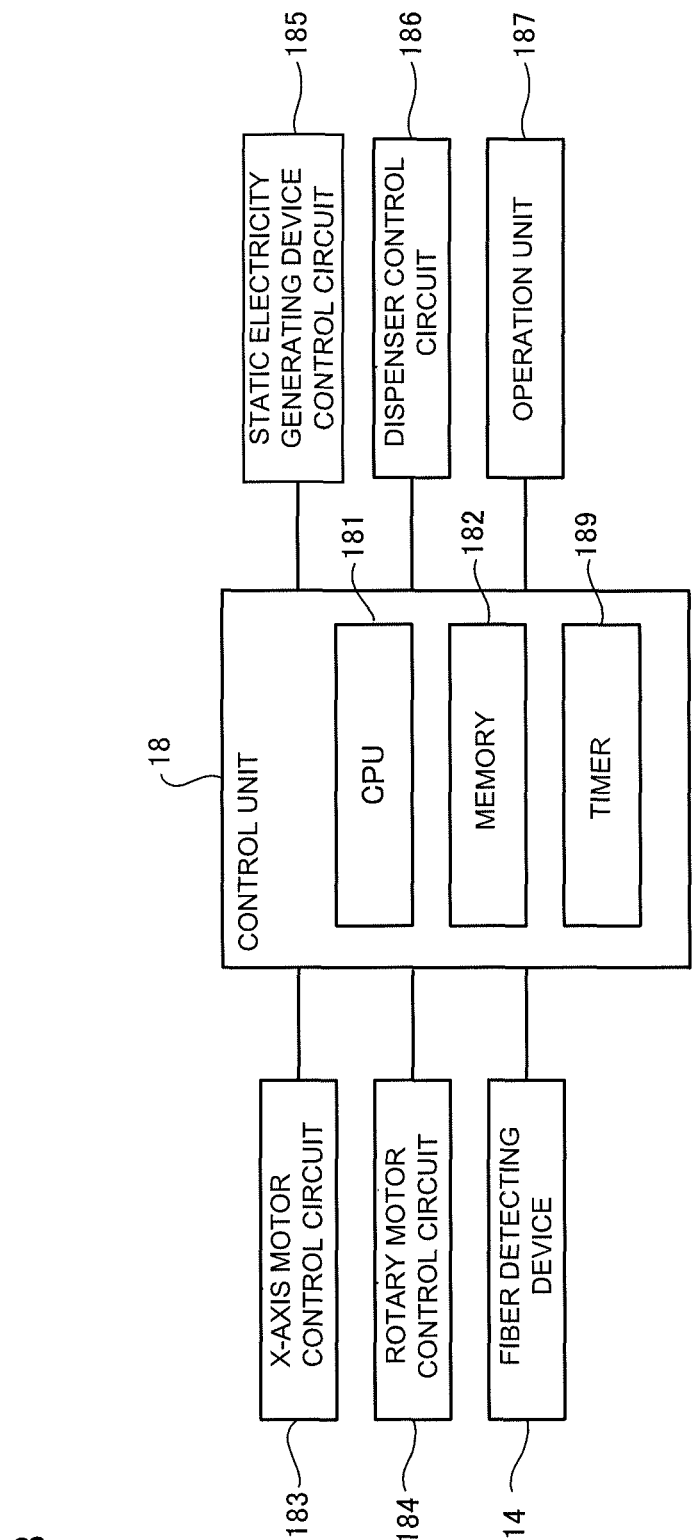
FIG. 3 is a block diagram that illustrates a circuit configuration of the optical connection component manufacturing apparatus according to this embodiment.

FIG. 3 is a block diagram that illustrates a circuit configuration of the optical connection component manufacturing apparatus 10 according to this embodiment.

A control unit 18 is connected to an X-axis motor control circuit 183, a rotary motor control circuit 184, a static electricity generating device control circuit 185, a dispenser control circuit 186, an operation unit 187, and the fiber detecting device 14. In addition, the control unit 18 includes a central processing unit (CPU) 181, a memory 182, and a timer 189 therein. In this memory 182, an operation program of the optical connection component manufacturing apparatus 10 is stored. The CPU 181 reads the operation program stored in the memory 182 and instructs each control circuit in accordance with the operation program.

The X-axis motor control circuit 183 is a circuit that controls the operation of the X-axis motor 1212 in accordance with an instruction given from the CPU 181. The rotary motor control circuit 184 is a circuit that controls the operation of the rotary motor 1511 in accordance with an instruction given from the CPU 181. The static electricity generating device control circuit 185 is a circuit that applies a voltage to the electrode of the static electricity generating device 13 in accordance with an instruction given from the CPU 181. The dispenser control circuit 186 is a circuit that controls the dripping amount of the refractive index matching liquid 20 dripping from the dispenser 16 by controlling the operation of the compressor connected to the dispenser 16. In addition, in the operation unit 187, various handlers that receive operations from an operator of the optical connection component manufacturing apparatus 10 are disposed.

Subsequently, the operation of the optical connection component manufacturing apparatus 10 will be described.

Figure 4:
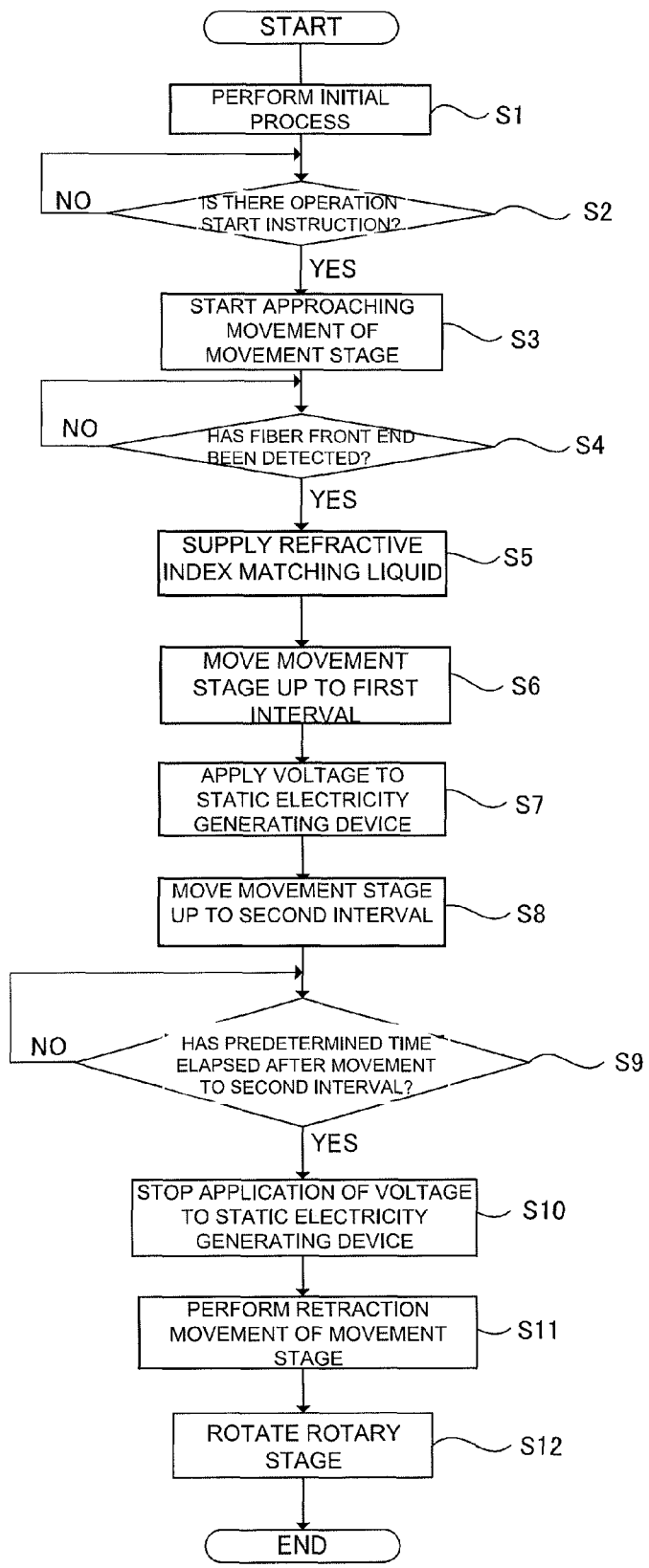
FIG. 4 is a flowchart that illustrates the operation of the optical connection component manufacturing apparatus according to this embodiment.

FIG. 4 is a flowchart that illustrates the operation of the optical connection component manufacturing apparatus 10 according to this embodiment.

Figure 5:
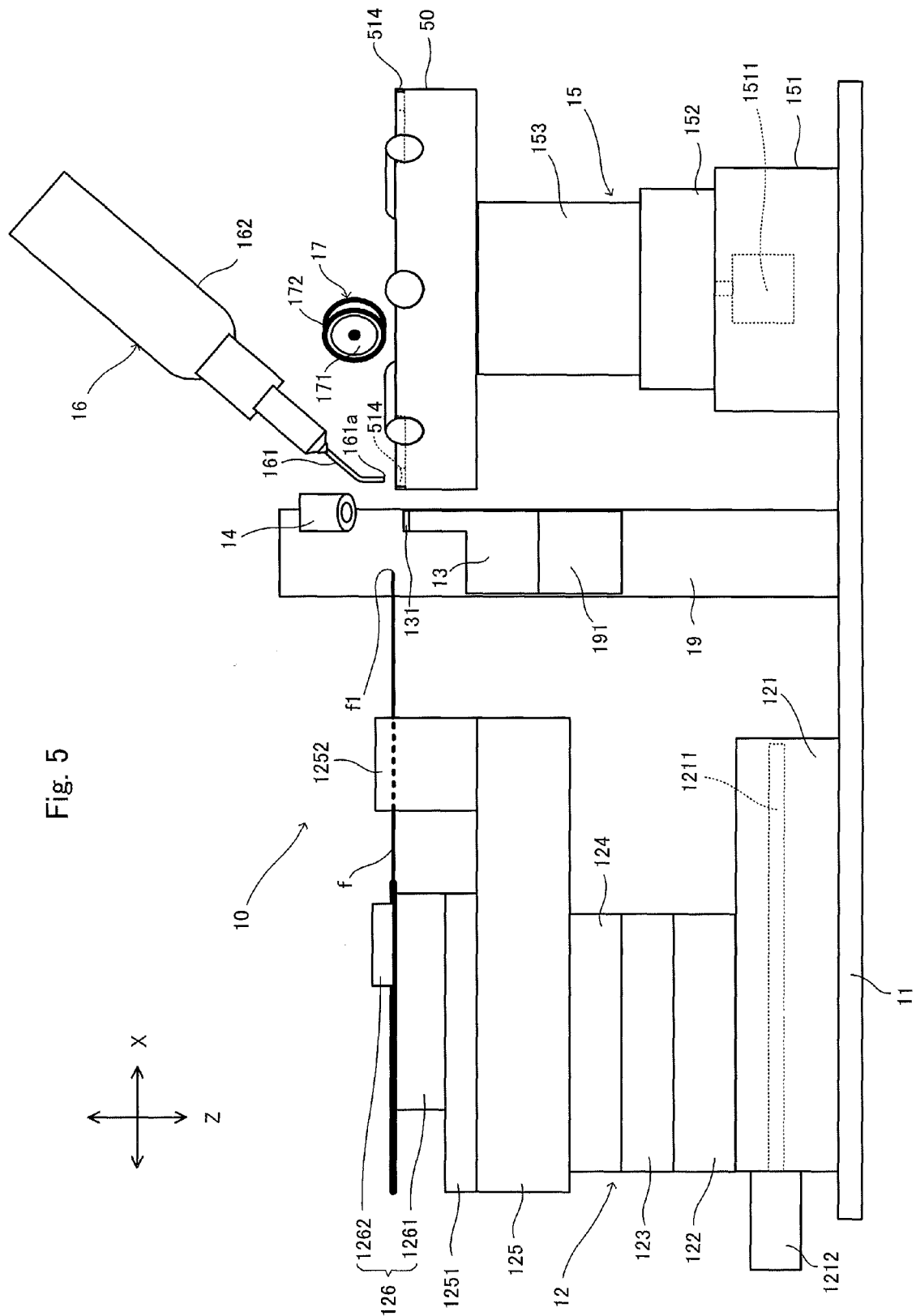
FIG. 5 is a side view that illustrates the optical connection component manufacturing apparatus that is in the state in which an initial process is completed.

When the power of the optical connection component manufacturing apparatus 10 is turned on, the CPU 181 reads the operation program from the memory 182 and performs an initial process in step S1. In this initial process, the CPU 181 transmits an initial operation signal to the X-axis motor control circuit 183. The X-axis motor control circuit 183 drives the X-axis motor 1212 based on the initial operation signal. By driving the X-axis motor 1212, the movement stage 122 moves to a separate position that is separate from the refractive index matching liquid holding unit 15 that is illustrated in FIG. 5. After this initial process, the operator of the optical connection component manufacturing apparatus 10 adjusts the positions of the adjustment stages 123, 124, and 153 such that the front end face f1 of the optical fiber f and the holding face 5141 have a predetermined positional relation in accordance with the length, the thickness, and the like of the optical fiber f. As described above, according to the optical connection component manufacturing apparatus 10 of this embodiment, the rise height of the refractive index matching liquid 20 held on the holding face 5141 can be sufficiently secured, and the supply of the refractive index matching liquid 20 can be easily adjusted such that the rise height of the refractive index matching liquid 20 is constant. In addition, the rise state according to the surface tension of the refractive index matching liquid 20 held on the holding face 5141 can be stabilized. Accordingly, the positional adjustment between the front end face f1 of the optical fiber f and the refractive index matching liquid 20 held on the holding face 5141 in the height direction using the Z-axis adjustment stage 153 does not need to be precisely performed, whereby an adjustment operation of the Z-axis adjustment stage 153 can be easily performed.

Next, when the operation unit 187 is operated by the operator, an operation detection signal is transmitted to the CPU 181. The operation detection signal corresponds to an operation start instruction for the CPU 181. The CPU 181 determines whether or not there is the operation start instruction in step S2. The CPU 181 repeats step S2 until there is an operation start instruction. When there is the operation start instruction, the CPU 181 transmits an approaching movement signal to the X-axis motor control circuit 183. The X-axis motor control circuit 183 drives the X-axis motor 1212 based on the approaching movement signal. By driving the X-axis motor 1212, the movement stage 122 starts to move to the X side in step S3.

The fiber detecting device 14 detects whether or not the front end face f1 of the optical fiber f arrives at a position located right above the electrode sheet 131. When the arrival of the front end face f1 of the optical fiber f at the position right above the electrode sheet 131 is detected, the fiber detecting device 14 transmits an arrival signal to the CPU 181. The CPU 181 determines whether or not the arrival signal has been received from the fiber detecting device 14 in step S4. The CPU 181 repeatedly performs step S4 until the arrival signal is received. Then, when the arrival signal is received, the CPU 181 transmits a supply signal to the dispenser control circuit 186. Based on the supply signal, as illustrated in FIG. 2B, the dispenser 16 supplies the refractive index matching liquid 20 of an amount for rising on the holding face 5141 according to the surface tension and swelling up to the outer side of the outer peripheral edge 5143 in step S5. Here, the operator experimentally supplies the refractive index matching liquid 20 from the dispenser 16 in advance, acquires the amount of the refractive index matching liquid 20 for rising on the holding face 5141 and swelling up to the outer side of the outer peripheral edge 5143, and designates the supply amount of the refractive index matching liquid 20 using the operation unit 187. In addition, in step S5, the dispenser 16, as illustrated in FIG. 2C, may supply the refractive index matching liquid 20 of an amount for arriving at the outer peripheral edge 5143 and rising on the holding face 5141 in accordance with the surface tension. This step S5 corresponds to an example of a supply and hold process.

Thereafter, the CPU 181 transmits a first interval movement signal to the X-axis motor control circuit 183, and the X-axis motor control circuit 183 drives the X-axis motor 1212 based on the first interval movement signal. As the X-axis motor 1212 is driven, the movement stage 122 moves further to the X-axis side by a predetermined distance from the time when the arrival signal is received in step S4 in step S6. In accordance with this movement, an interval (hereinafter, referred to as a fiber-to-liquid interval) between the front end face f1 of the optical fiber f and the refractive index matching liquid 20 held in the refractive index matching liquid holding unit 15 is adjusted to the first interval L1. This first interval L1 is an interval at which the refractive index matching liquid 20 held on the holding face 5141 is adsorbed, by the Coulomb force according to the charging, onto the front end face f1 of the optical fiber f that is charged by the static electricity generating device 13. FIG. 1 illustrates a state in which the interval between the front end face f1 of the optical fiber f and the refractive index matching liquid 20 held in the refractive index matching liquid holding unit 15 is adjusted to the first interval L1, in other words, the state in which step S6 is completed. The process performing this step S6 corresponds to an example of a first interval adjusting process. Here, steps S5 and S6 may be performed in parallel with each other, or the execution of step S6 may be started before the execution of step S5 is started.

Subsequently, the CPU 181 transmits a voltage application start signal to the static electricity generating device control circuit 185. The static electricity generating device 13 applies a voltage to the electrode sheet 131 based on the voltage application start signal in step S7. By applying the voltage to the electrode sheet 131, electric charge is applied to the optical fiber f so as to be charged with static electricity. The refractive index matching liquid 20 is adsorbed, by the Coulomb force according to the static electricity applied to optical fiber f, onto the front end face f1 of the optical fiber f. This step S7 corresponds to an example of the charging process. In addition, the CPU 181 may transmit the voltage application start signal after a predetermined time that is required until the density of the refractive index matching body of the refractive index matching liquid 20 arrives at a desired density in accordance with the volatility of the solvent after the dispenser 16 supplies the refractive index matching liquid 20 to the holding face 5141. In this way, the refractive index matching liquid 20 of a desired amount can be easily adsorbed only onto the front end face f1 of the optical fiber f.

Subsequently, the CPU 181 transmits an intermediate retraction movement signal to the X-axis motor control circuit 183. The X-axis motor control circuit 183 drives the X-axis motor 1212 based on the intermediate retraction movement signal. As the X-axis motor 1212 is driven in the state in which a voltage is applied to the electrode sheet 131, the movement stage 122 is moved to the −X side by a predetermined distance in step S8. In accordance with the movement of this step S8, the fiber-to-liquid interval is increased from the first interval L1 to a second interval L2 wider than the first interval. Step S8 is a process of increasing the interval from the first interval L1 to the second interval in the state in which electric charge is continuously applied to the optical fiber f. In other words, the process of step S8 corresponds to an example of an interval increasing process. A distance increased from the first interval L1 to the second interval in step S8 is set in accordance with a film thickness that is required for the refractive index matching body that is attached to the optical fiber f together with the setting of a predetermined time in step S9 to be described later. More specifically, the distance to be increased is set in the range of 0 mm to 1 mm, and more preferably, in the range of 10 μm to 200 μm. In this embodiment, the X-axis motor 1212 is controlled by using a pulse control method, whereby the distance is increased to the second interval.

Figure 6A:
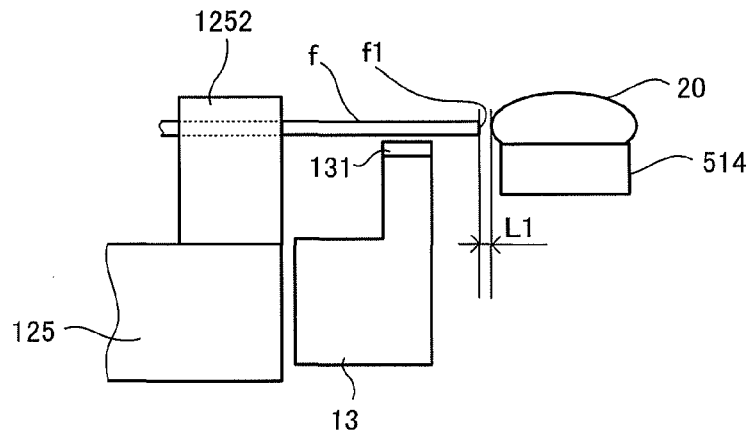
FIGS. 6A, 6B, and 6C are diagrams that illustrate the appearances of attaching the refractive index matching liquid to the front end face of an optical fiber.
Figure 6B:
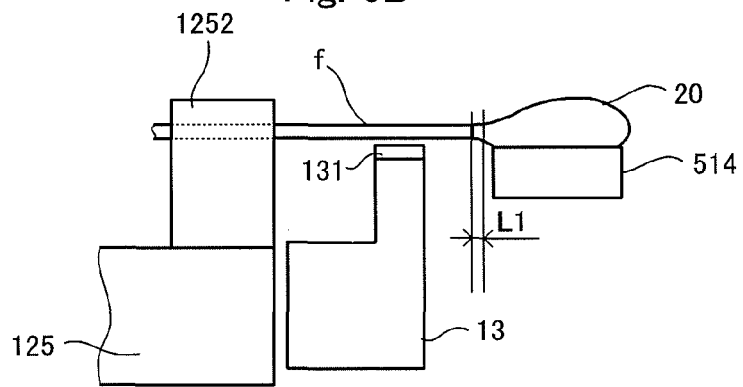
Figure 6C:
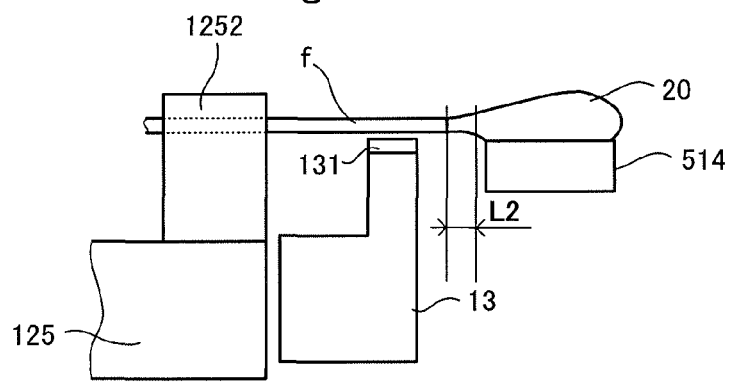

FIGS. 6A, 6B, and 6C are diagrams that illustrate the appearances of attaching the refractive index matching liquid to the front end face of the optical fiber. FIG. 6A illustrates the appearance of a state in which step S6 is completed, FIG. 6B illustrates the appearance of a state in which step S7 is performed, and FIG. 6C illustrates the appearance of a state in which step S8 is completed.

Before a voltage is applied to the electrode sheet 131 of the static electricity generating device 13, as illustrated in FIG. 6A, the refractive index matching liquid 20 is not adsorbed onto the front end face f1 of the optical fiber f. When a voltage is applied in step S7, electric charge is applied to the optical fiber f so as to be charged with static electricity. As illustrated in FIG. 6B, the refractive index matching liquid 20 is adsorbed, by the Coulomb force according to the static electricity applied to the optical fiber f, onto the front end face f1 of the optical fiber f. In the state in which the voltage is continuously applied, when the distance increases from the first interval L1 illustrated in FIG. 6B to the second interval L2, as illustrated in FIG. 6C, the refractive index matching liquid 20 is stretched in the state being adsorbed onto the front end face f1 of the optical fiber f Accordingly, the amount of the refractive index matching liquid 20 adsorbed onto the front end face f1 of the optical fiber f increases, whereby the film thickness of the refractive index matching body attached to the front end face f1 of the optical fiber f can be increased.

At a time point when the distance is increased to the second interval L2, the CPU 181 starts the measurement of time by operating the timer 189 and determines whether a predetermined time has elapsed in step S9. The CPU 181 repeatedly performs step S9 until the predetermined time elapses. When the predetermined time elapses, the CPU 181 outputs a voltage application stop signal to the static electricity generating device control circuit 185. The static electricity generating device 13 stops the application of the voltage to the electrode sheet 131 based on the voltage application stop signal in step S10. This predetermined time is set in accordance with a required film thickness of the refractive index matching body attached to the front end face f1 of the optical fiber f together with the setting of the distance increased from the first interval L1 to the second interval L2 in step S8 described above. More specifically, the predetermined time is set in a range of 0 sec to 3 sec and is more preferably set in a range of 0.1 sec to 2.0 sec. It is determined whether or not the distance increases to the second interval by measuring the operation time of a stepping motor in advance, estimating a time point at which the distance increases to the second interval based on the measured time using the CPU 181, and then the measurement of time is started. Here, it may be configured such that a sensor detecting that the distance is increased to the second interval is arranged, and time is measured based on a detection signal transmitted from the sensor. In this embodiment, while the time is measured using the timer 189 at the time point when the distance increases to the second interval L2, the measurement of time may be started using the timer 189 at a time point when the retraction movement signal is output to the X-axis motor control circuit 183.

After the application of the voltage is stopped in step S10, the CPU 181 transmits a complete retraction signal to the X-axis motor control circuit 183. The X-axis motor control circuit 183 drives the X-axis motor 1212 based on the complete retraction signal. As the X-axis motor 1212 is driven, the movement stage 122 is moved to the −X side in step S11. Accordingly, the optical fiber f in which the refractive index matching liquid 20 is attached to the front end face f1 can be acquired.

When the amount of the refractive index matching liquid 20 attached to the front end face f1 of the optical fiber f is the same, the higher the density of the refractive index matching body in the refractive index matching liquid 20 is, the larger the film thickness of the refractive index matching body 21 is. However, when the density of the refractive index matching body in the refractive index matching liquid 20 increases, the mobility of the refractive index matching liquid 20 decreases, and accordingly, the separation position of the refractive index matching liquid 20 is near the front end face f1 of the optical fiber f, whereby the amount of the refractive index matching liquid 20 attached to the front end face f1 of the optical fiber f decreases. Accordingly, by only increasing the density of the refractive index matching body in the refractive index matching liquid 20, the film thickness of the refractive index matching body 21 decreases. In addition, when the density of the refractive index matching body in the refractive index matching liquid 20 increases, so-called a stringing phenomenon may easily occur. When the stringing phenomenon occurs, it is difficult to stabilize the amount and the shape of the refractive index matching liquid 20 attached to the front end face f1 of the optical fiber f.

Figure 7A:
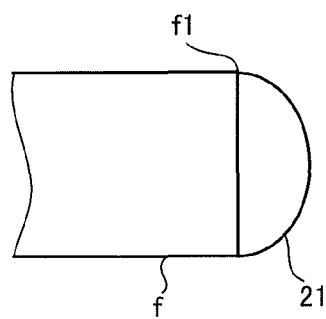
FIGS. 7A and 7B are diagrams that illustrate appearances in which the forms of the refractive index matching body attached to the front end face of the optical fiber are different from each other in accordance with the density of the refractive index matching body in the refractive index matching liquid.
Figure 7B:
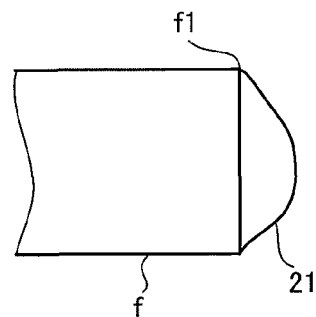

FIGS. 7A and 7B are diagrams that illustrate appearances in which the forms of the refractive index matching body attached to the front end face of the optical fiber are different from each other in accordance with the density of the refractive index matching body in the refractive index matching liquid. In FIGS. 7A and 7B, while the appearances of the attachment of the refractive index matching body 21 to the front end face f1 of the optical fiber f onto which the refractive index matching liquid 20 is adsorbed are illustrated, in the form illustrated in FIG. 7B, the density of the refractive index matching body in the refractive index matching liquid 20 is higher than that of the form illustrated in FIG. 7A.

In the form illustrated in FIG. 7A, while a refractive index matching body 21 is formed in a clear arc shape, in the form illustrated in FIG. 7B, a refractive index matching body 21 is not formed in a clear arc shape. The reason for this is considered as follows. When the density of the refractive index matching body in the refractive index matching liquid 20 increases, it may be easily influenced by the volatility of the solvent, and a change in the viscosity of the refractive index matching body 21 due to the volatility of the solvent increases. In this way, the shape of the refractive index matching body 21 differs in accordance with the density of the refractive index matching body in the refractive index matching liquid 20, and there is concern that the quality of the optical connection component manufactured by the optical connection component manufacturing apparatus 10 may be influenced. Accordingly, in a case where the film thickness of the refractive index matching body 21 is controlled by adjusting the density of the refractive index matching body in the refractive index matching liquid 20, there are cases where the quality of the optical connection component is influenced, which is not desirable.

As described above, in this embodiment, the amount of the refractive index matching liquid 20 attached to the front end face f1 of the optical fiber f can be adjusted by adjusting a distance increased from the first interval L1 to the second interval L2 in the state in which a voltage is applied or a time during which the voltage is continuously applied after the second interval L2 of the distance. Accordingly, the film thickness of the refractive index matching body can be adjusted by increasing the film thickness of the refractive index matching body attached to the front end face f1 of the optical fiber f or the like.

Figure 8:
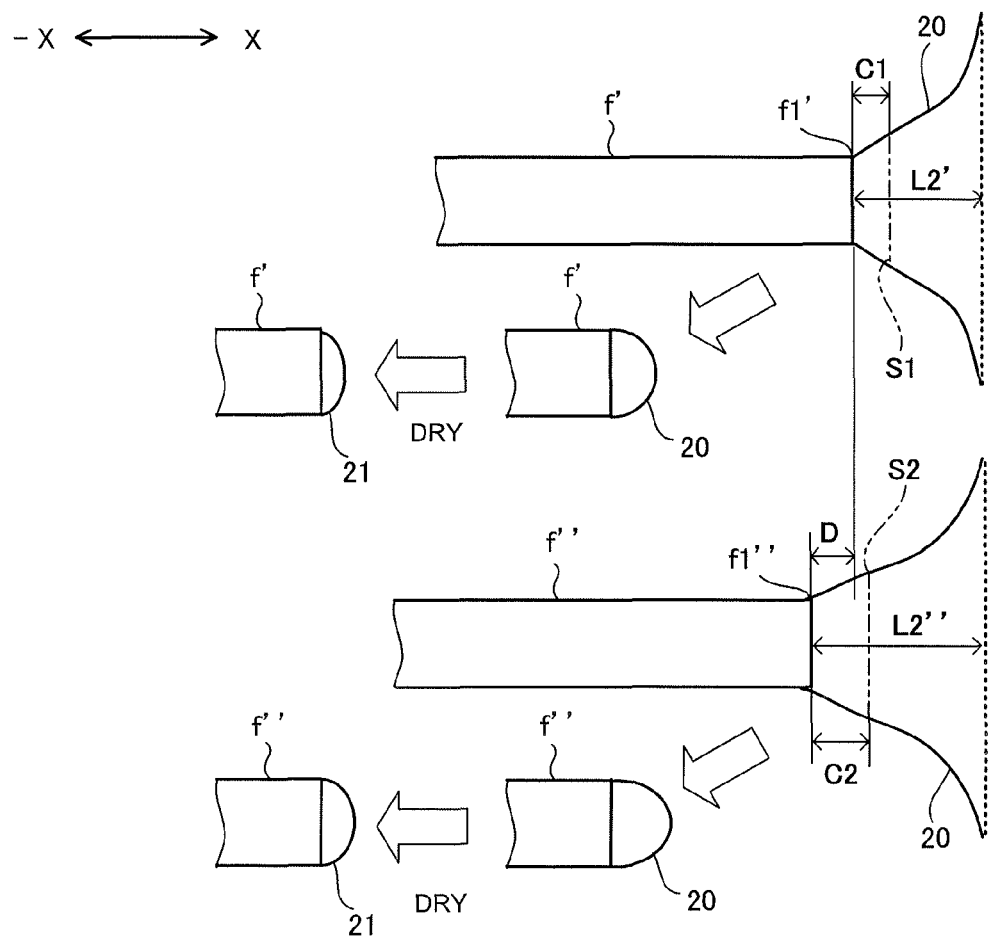
FIG. 8 is a diagram that illustrates a phenomenon in which the film thickness of the refractive index matching body attached to the front end face of the optical fiber is different in accordance with the length of a second interval.

FIG. 8 is a diagram that illustrates a phenomenon in which the film thickness of the refractive index matching body attached to the front end face of the optical fiber is different in accordance with the length of the second interval. FIG. 8 illustrates forms having mutually different second intervals L2 to be vertically aligned, and an appearance in which the refractive index matching liquid 20 is attached to the front end face f1 of the optical fiber f and an appearance in which the attached refractive index matching liquid 20 is dried to be the refractive index matching body 21 are illustrated in accordance with arrows therein. Positions (separation positions) at which the refractive index matching liquid 20 stretched in the state of being adsorbed onto the front end face f1 of the optical fiber f are separated are denoted by two-dot chain lines. Hereinafter, the form illustrated on the upper side in FIG. 8 will be referred to as a first form, and the form illustrated on the lower side in FIG. 8 will be referred to as a second form.

As illustrated in FIG. 8, an optical fiber f" of the second form is moved to the −X side (the left side in FIG. 8) with respect to an optical fiber f' of the first form by a distance D. Accordingly, a second interval L2" of the second form is increased by the distance D with respect to a second interval L2' of the first form, and the refractive index matching liquid 20 of the second form is stretched more than the refractive index matching liquid 20 of the first form. Accordingly, a distance C2 between the front end face f1" of the optical fiber f" and the separation position S2 of the second form is longer than a distance C1 between the front end face f1' of the optical fiber f' and the separation position S1 of the first form. As a result, the amount of the refractive index matching liquid 20 attached to the front end face f1" of the optical fiber f" of the second form is larger than that of the refractive index matching liquid 20 attached to the front end face f1' of the optical fiber f' of the first form, whereby the film thickness of the refractive index matching body 21 is large in the second form. As above, by increasing the second interval L2, the film thickness of the refractive index matching body 21 attached to the front end face f1 of the optical fiber f can be configured to be large. In addition, by adjusting the second interval L2, the film thickness of the refractive index matching body 21 attached to the front end face f1 of the optical fiber f can be adjusted.

In this embodiment, while the movement of the movement stage 122 to the −X side is stopped at a time point when the distance is the second interval L2 in step S8, the application of the voltage may be stopped at the time point when the distance is increased to the second interval L2 without stopping the movement of the movement stage 122 to the −X side. In addition, it may be configured such that the movement speed of the movement stage 122 to the −X side is reduced at the time point when the distance is increased to the second interval L2, and the application of the voltage is stopped. Furthermore, steps S10 and S11 may be performed at the same time.

This refractive index matching liquid 20 is solidified as the solvent contained in the liquid volatiles and becomes a refractive index matching body of the gel phase that has elasticity. The optical connection component is a component that is acquired by attaching the refractive index matching body to the front end face f1 of the optical fiber f. While the solvent may volatile under an ordinary environment, the solvent may be dried in a forced manner so as to promote the volatilization.

Finally, the CPU 181 transmits a rotation signal to the rotary motor control circuit 184. The rotary motor control circuit 184 drives the rotary motor 1511 based on the rotation signal. As the rotary motor 1511 is driven, the rotary stage 152 rotates until the supply position relation in which the supply port 161a of the nozzle 161 is positioned on the upper side of the holding face 5141 of the other protruded portion 514 in step S12 and ends a series of operations.

Figure 9A:
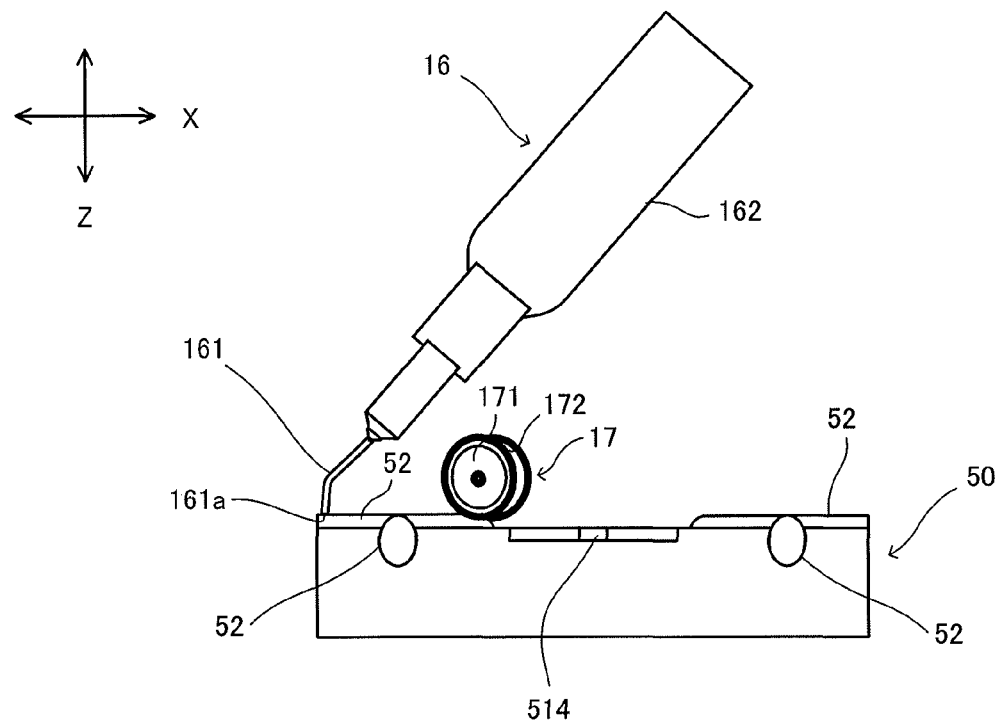
FIG. 9A is a side view that illustrates a state in which the holding unit is in the middle of rotation in step S12.
Figure 9B:
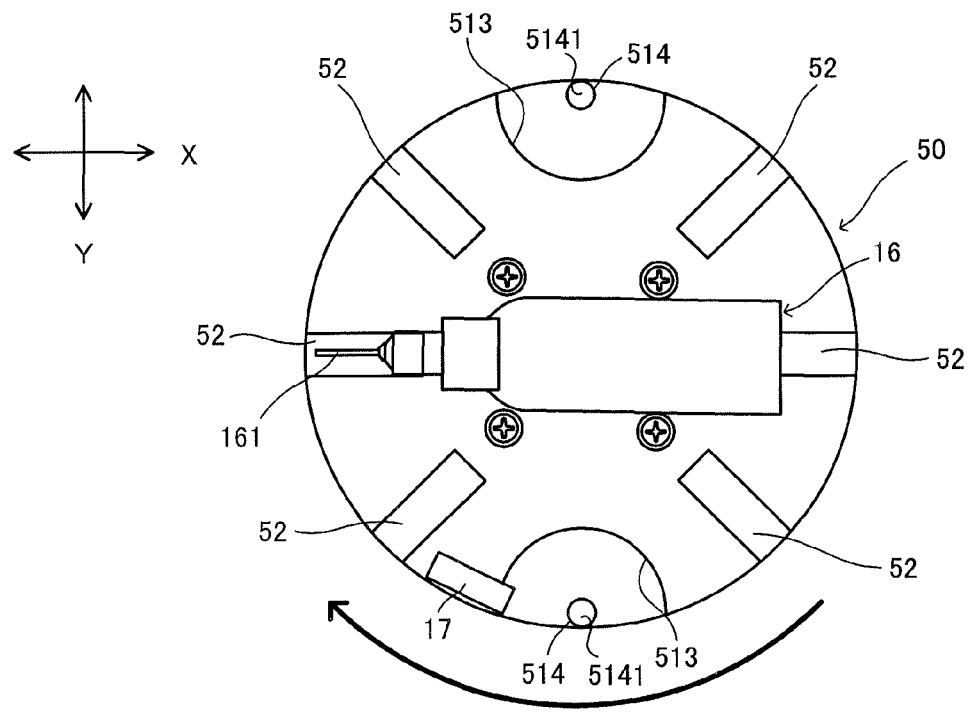
FIG. 9B is a plan view of FIG. 9A.

FIG. 9A is a side view that illustrates a state in which the holding unit is in the middle of rotation in step S12, and FIG. 9B is a plan view of FIG. 9A. FIGS. 9A and 9B illustrate the holding unit 50, the dispenser 16, and the removal member 17.

When the holding unit 50 rotates, as illustrated in FIGS. 9A and 9B, the supply port 161a of the nozzle 161 is brought into contact with the plurality of the cleaning members 52. Accordingly, the refractive index matching liquid 20 remaining in the supply port 161a can be wiped off by the cleaning members 52. In addition, the cleaning members 52 that have wiped off the refractive index matching liquid 20 are brought into contact with the removal member 17. Accordingly, the refractive index matching liquid 20 attached to the cleaning members 52 is removed by the removal member 17.

The operator of the optical connection component manufacturing apparatus 10 detaches the optical fiber f in which the refractive index matching liquid 20 is attached to the front end face f1 from the optical connection component manufacturing apparatus 10 together with the fiber fixture 126. Then, a new optical fiber f is fixed to the fiber fixture 126, and the fiber fixture 126 is mounted to the optical connection component manufacturing apparatus 10. Thereafter, by operating an operation start handler disposed in the operation unit 187, the operation of step S3 and subsequent operations are performed. By repeatedly performing such operations, the optical connection components of a desired number can be manufactured.

The operator performs operations of wiping off the refractive index matching liquid 20 remaining on the holding face 5141 and the refractive index matching liquid 20 dripped from the holding face 5141.

Figure 10A:
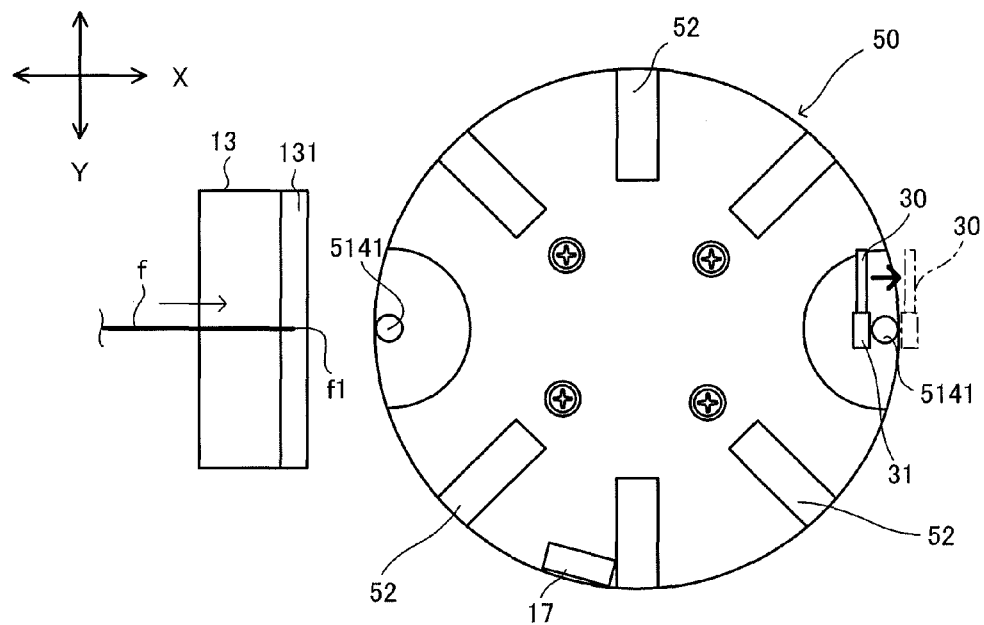
FIG. 10A is a plan view that illustrates the appearance of wiping off the refractive index matching liquid remaining on the holding face using a wiping member.
Figure 10B:
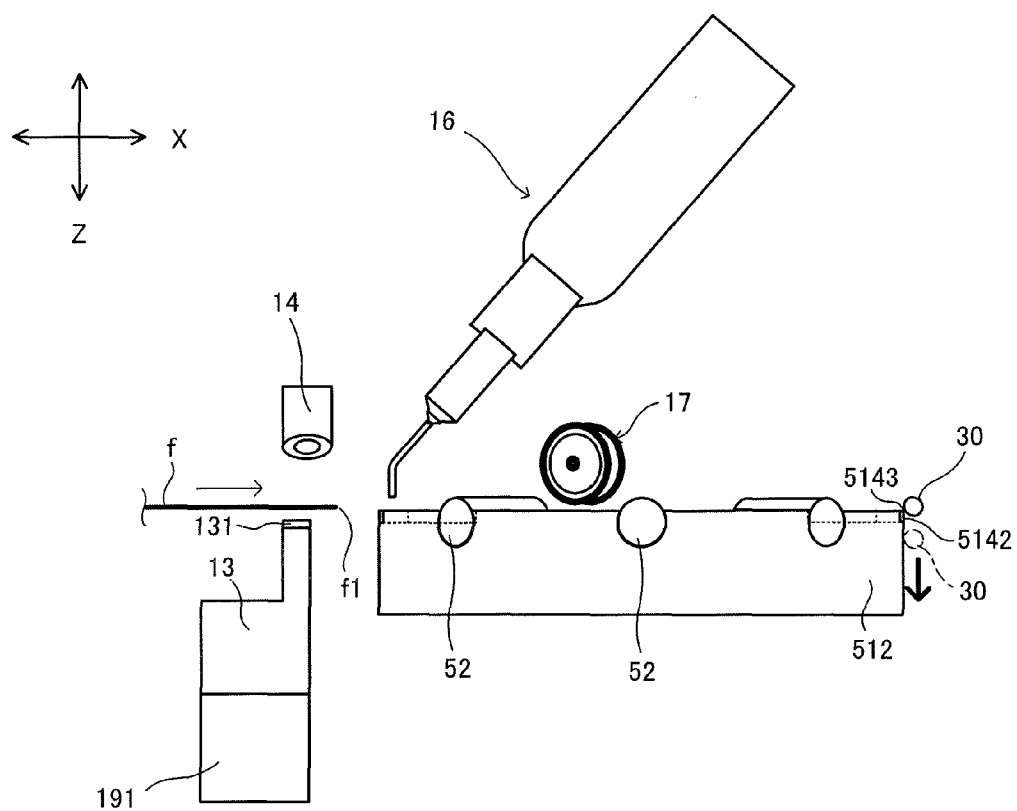
FIG. 10B is a side view that illustrates the appearance of wiping off the refractive index matching liquid attached to a side face of the protruded portion using the wiping member.

FIG. 10A is a plan view that illustrates the operation of wiping off the refractive index matching liquid remaining on the holding face, and FIG. 10B is a side view that illustrates the operation of wiping off the refractive index matching liquid dripped from the holding face.

As illustrated in FIG. 10A, the operator can wipe off the refractive index matching liquid 20 remaining on the holding face 5141, for example, using a wiping tool 30 including a sponge-shaped wiping unit 31 by moving the wiping tool 30 as denoted by a thick arrow in the figure while bringing the wiping unit 31 into contact with the holding face 5141. Thereafter, as denoted by a thick arrow in FIG. 10B, by moving the wiping tool 30 such that the wiping unit 31 follows the side face 5142 of the protruded portion 514 to the lower side from the outer peripheral edge 5143, the refractive index matching liquid 20 that is dripped on the side face 5142 from the holding face 5141 can be wiped off. As above, since the outer peripheral edge 5143 of the protruded portion 514 is a boundary between the holding face 5141 and the side face 5142, the refractive index matching liquid 20 remaining on the holding face 5141 and the refractive index matching liquid 20 that is dripped from the holding face 5141 and is attached to the side face 5142 can be wiped off by consecutive operations.

The operation of wiping the refractive index matching liquid 20 can be performed while the operation of step S3 and subsequent operations are performed after the operation start handler is operated. Accordingly, the operation of the optical connection component manufacturing apparatus 10 is not interrupted by the wiping operation.

As described above, according to the optical connection component manufacturing apparatus 10 of this embodiment, since the holding face 5141 has the outer peripheral edge 5143 connected in the curved line, it is easy for the refractive index matching liquid 20 held on the holding face 5141 to rise by the outer peripheral edge 5143. Accordingly, the rise height of the refractive index matching liquid 20 can be easily secured. In addition, since the holding face 5141 is partitioned by the outer peripheral edge 5143 connected in the curved line, it is easy to adjust the rise height of the refractive index matching liquid 20 held on the holding face 5141 to be constant. In addition, the rise state according to the surface tension of the refractive index matching liquid 20 held on the holding face 5141 is stabilized by the outer peripheral edge 5143 connected in the curved line. As a result, the positional adjustment between the front end face f1 of the optical fiber f and the refractive index matching liquid 20 held on the holding face 5141 in the height direction does not need to be precisely performed, whereby the adjustment operation can be easily performed.

According to the optical connection component manufacturing apparatus 10 and a method of manufacturing an optical connection component of this embodiment, the refractive index matching liquid 20 of a desired amount can be adsorbed onto the front end face f1 of the optical fiber f, and the film thickness of the refractive index matching body attached to the optical connection component can be configured to be large.

The present invention is not limited to the above-described embodiment, but various changes can be made in the embodiment within the range described in the claims. For example, in this embodiment, while the optical fiber f is configured to be moved to the refractive index matching liquid 20 side, the refractive index matching liquid 20 may be configured to be moved to the optical fiber f side by moving the refractive index matching liquid holding unit 15 instead of moving the optical fiber f. Furthermore, both the optical fiber f and the refractive index matching liquid 20 may be configured to be moved. In addition, in this embodiment, while the optical fiber f is configured to be moved to a proximity position by moving it in the X-axis direction that is the axial center direction, the optical fiber may be configured to be moved to a proximity position by moving it in any other direction or may be configured to be moved to a proximity position by rotating it around the Z-axis direction axis or the Y-axis direction axis as the rotation center axis. Furthermore, in this embodiment, while the optical fiber f is used as the optical member, any other optical member such as a rod lens may be used, or a linear dielectric such as glass, ceramics, or plastic other than the optical member may be used. In addition, according to this embodiment, while the refractive index matching liquid 20 is adsorbed onto the front end face f1 of the optical fiber f, a high polymer material coat may be formed on the front end face of the linear dielectric by using a high polymer material of the liquid phase other than the refractive index matching liquid 20. Furthermore, in this embodiment, by rotating the holding unit 50, while the positional relation between the holding face 5141 and the supply port 161a is configured to be changed between the supply position relation and non-supply position relation, the positional relation between the holding face 5141 and the supply port 161a may be configured to be changed between the supply position relation and the non-supply position relation by moving the holding unit 50 without rotating the holding unit 50. In addition, the positional relation between the holding face 5141 and the supply port 161a may be configured to be changed between the supply position relation and the non-supply position relation by moving the supply port 161a without rotating or moving the holding unit 50.

A constituent element included in each modified example described above may be applied to any other modified example.

What is claimed is:

1. An optical connection component manufacturing apparatus comprising:
   a holding face that holds a refractive index matching liquid;
   a supplier that supplies the refractive index matching liquid to the holding face;
   a charger that charges a linear optical member; and
   a controller that performs controls to:
   (i) adjust an interval between the refractive index matching liquid held on the holding face and a front end face of the linear optical member by moving at least one of the holding face and the linear optical member,
   (ii) set the interval to a first interval at which the refractive index matching liquid held on the holding face is adsorbed, by a Coulomb force according to the charging, onto the front end face of the linear optical member charged by the charger and then enlarges the interval,
   (iii) apply, using the charger, an electric charge to the linear optical member in a state in which the interval is the first interval and continuously applies electric charge to the linear optical member even after the interval starts to be enlarged,
(iv) stop a movement at a time point when the interval is a second interval that is larger than the first interval and then further enlarges the interval, and
(v) using the charger, to continuously apply electric charge at least to the linear optical member until the interval is the second interval.

2. The optical connection component manufacturing apparatus according to claim 1, wherein the controller further performs controls, using the charger, to end the application of electric charge to the linear optical member at a time point when a time during which the second interval is maintained arrives at a predetermined time after the interval becomes the second interval.

\* \* \* \* \*